(12) United States Patent
Skillman et al.

(10) Patent No.: US 7,969,426 B2
(45) Date of Patent: Jun. 28, 2011

(54) LIGHT SENSITIVE DISPLAY INTERFACE FOR COMPUTING DEVICES

(75) Inventors: Peter Skillman, San Carlos, CA (US); Chun Wun Yeung, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1129 days.

(21) Appl. No.: 11/555,214

(22) Filed: Oct. 31, 2006

(65) Prior Publication Data

US 2008/0100593 A1 May 1, 2008

(51) Int. Cl.
*G06F 3/042* (2006.01)
*G06K 11/06* (2006.01)

(52) U.S. Cl. ............ 345/175; 345/173; 178/18.03; 178/18.09; 178/18.11

(58) Field of Classification Search .......... 345/156, 345/157, 163, 166, 173, 175, 204, 207; 178/18.01, 178/18.03, 18.09, 18.11
See application file for complete search history.

(56) References Cited

U.S. PATENT DOCUMENTS

| | | | | |
|---|---|---|---|---|
| 4,247,767 A * | 1/1981 | O'Brien et al. | | 250/221 |
| 5,105,186 A * | 4/1992 | May | | 345/175 |
| 6,498,602 B1 * | 12/2002 | Ogawa | | 345/173 |
| 6,504,530 B1 * | 1/2003 | Wilson et al. | | 345/175 |
| 6,654,007 B2 * | 11/2003 | Ito | | 345/175 |
| 6,816,154 B2 * | 11/2004 | Wong et al. | | 345/175 |
| 6,972,753 B1 * | 12/2005 | Kimura et al. | | 345/175 |
| 7,006,080 B2 | 2/2006 | Gettemy | | |
| 7,411,583 B1 * | 8/2008 | Wong et al. | | 345/175 |
| 7,800,594 B2 * | 9/2010 | Nakamura et al. | | 345/175 |
| 2002/0030668 A1 * | 3/2002 | Hoshino et al. | | 345/175 |
| 2002/0158883 A1 | 10/2002 | Cheri et al. | | |
| 2003/0156100 A1 | 8/2003 | Gettemy | | |
| 2003/0179323 A1 | 9/2003 | Abileah et al. | | |
| 2004/0179001 A1 * | 9/2004 | Morrison et al. | | 345/179 |
| 2004/0207605 A1 * | 10/2004 | Mackey et al. | | 345/173 |
| 2005/0243055 A1 * | 11/2005 | Ranta et al. | | 345/156 |
| 2006/0279557 A1 | 12/2006 | Gettemy | | |

FOREIGN PATENT DOCUMENTS

EP 1100041 5/2001

OTHER PUBLICATIONS

International Preliminary Report on Patentabliity of May 5, 2009 in International Application PCT/US2007/083025 7 pages.
International Search Report and Written Opinion of the International Searching Authority in International Application PCT/US2007/083025, European Patent Office, Apr. 21, 2008, 11 pages.

* cited by examiner

*Primary Examiner* — My-Chau T Tran
(74) *Attorney, Agent, or Firm* — Mahamedi Paradice Kreisman, LLP; Van Mahamedi (57) ABSTRACT

According to one or more embodiments, a variation is detected in light that is cast over a display interface of a computing device. A characteristic of the light variation is identified. From this characteristic, a determination is made as to whether the variation in light is to be interpreted as an input or to be ignored.

8 Claims, 11 Drawing Sheets

LIGHT SENSITIVE DISPLAY INTERFACE FOR COMPUTING DEVICES

TECHNICAL FIELD

The disclosed embodiments relate generally to the field of human interfaces for computing devices. More particularly, the disclosed embodiments relate to a light sensitive display interface for computing devices.

BACKGROUND

Optical touch screens are a form of light sensitive display interfaces. An optical touch screen uses light sensors to detect an object being placed in proximity or against a display interface. Many existing optical touch screen applications use a controlled environment, where incidental or inadvertent light variations are less of an issue. But there is increasing attention to using optical touch screens on portable and small-form factor devices, because optical touch screens provide better lighting, are more efficient, and can potentially reduce thickness of the device.

DETAILED DESCRIPTION

Embodiments described herein provide for a light sensitive display interface for computing devices. A computing device, such as a mobile device, may be provided with an optical "touch" (actually light sensitive) screen display that detects user-interaction based on the presence of light variations cast onto the display. The computing device may be equipped with display logic and other features to identify when lighting variations are attributable to an object such as a stylus being brought into contact or proximity to the display screen.

In addition, one or more embodiments provide that the stylus is equipped to cause an identifiable and detectable light variation when used against the display screen. In particular, one or more embodiments provide that the stylus is configured to cause an iconic or otherwise identifiable light or shading pattern against the display of the computing device. This light or shading pattern can be correlated by the display object of the computing device to being the result of the stylus tip portion being brought into contact, or near contact, with the display surface.

Numerous embodiments, variations, and implementations are described herein for enabling use of a light sensitive display interface with a stylus type object. Among benefits described, the light sensitive display interface may be made thinner than many convention touch-screens that use digitizers. Moreover, elimination of contact-sensitive materials and layers enables use of brighter and more efficient lighting elements for computing devices. Additionally, embodiments described herein avoid the use of capacitive based layers for detecting user-interaction with a display screen. This allows users to interact with a display interface, such as provided with embodiments described below, using an object such as a stylus, as opposed to a finger needed for capacitance detection.

According to one or more embodiments, a variation is detected in light that is cast over a display interface of a computing device. A characteristic of the light variation is identified. From this characteristic, a determination is made as to whether the variation in light is to be interpreted as an input or to be ignored.

In one embodiment, an interface system is provided for a computing device. The interface system includes a stylus and a display interface on the computing device. The stylus includes a tip portion, and the display interface has one or more light sensors. The light sensors are configured to detect light variations cast onto the display interface. The interface system also includes display logic that is configured to interpret a light variation as being attributable to the tip portion of the stylus being brought into contact or proximity to the display interface.

According an another embodiment, a stylus is provided for use with a computing device on which a light-sensitive display interface is provided. The stylus includes a tip portion that includes one or more structures or surfaces that create a variation in a light cast over the display interface, when the tip portion is brought into contact or close proximity to the display interface. The resulting variation is known (programmatically or otherwise) to be characteristic of the tip portion when the tip portion is brought into contact or close proximity to the display interface.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a sub-routine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor (s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Figure 1A:
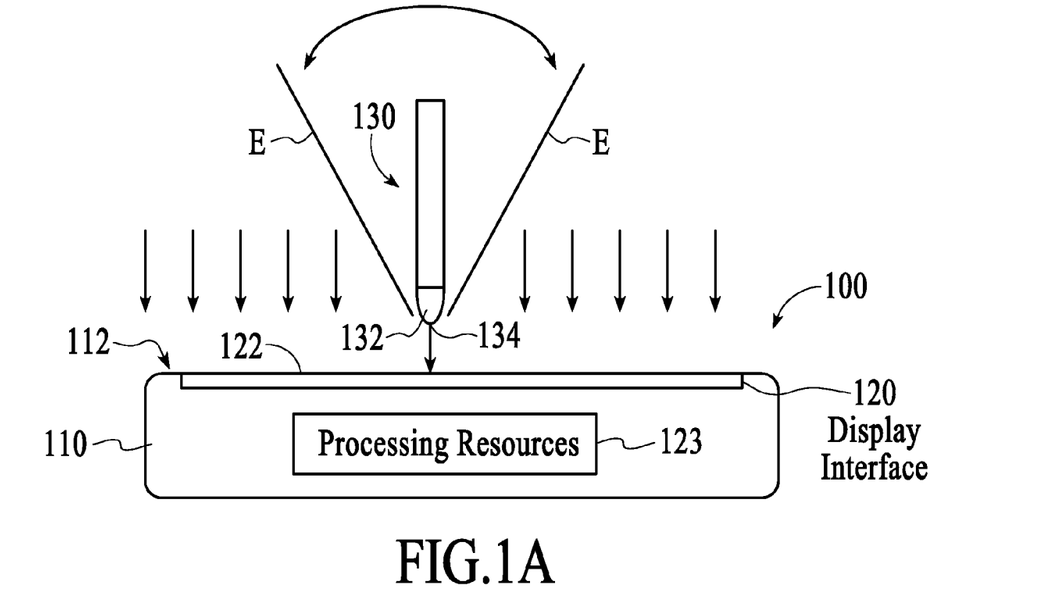
FIG. 1A illustrates implementation of an optical display interface on a mobile computing device, according to an embodiment of the invention.

FIG. 1A illustrates implementation of an optical display interface on a mobile computing device, according to an embodiment of the invention. In an embodiment, a mobile computing device 100 includes a housing 110 that includes a front facade 112. A display interface 120 is integrated with the housing 110 and provides a display surface 122 on the front facade 112. The display surface 122 displays data generated by processing resources 123 of the computing device 100, such as in the form of images, video, text or other content. In one implementation, display surface 122 is comprised of individual pixels, each of which may include a red, green and blue element. The display interface 120 is light sensitive, so that variations in light that is cast on the display surface 122 forms the basis for detecting whether a user is interacting with the display interface. In one implementation, the display interface 120 is made light sensitive through the distribution of photodiodes on a grid that encompasses at least a portion of the span of the display surface 122. As described with an embodiment of FIG. 2, light sensors are provided in the form of photodiodes that are combined with circuitry that communicates with logic or processing resources of the device 100. Alternative implementations may use different forms of light sensors. Furthermore, light sensors may be provided separate from the display interface 120, such as incorporated into the housing 110.

The computing device 100 may correspond to any one of many kinds of devices. An example of computing device 100 includes a cellular device capable of transmitting and receiving voice communications over cellular networks. A specific example of a device that can be used with one or more embodiments is wireless messaging and phone hybrid, sometimes referred to as a "smart phone" or a "mobile manager". Other embodiments may apply to other kinds of portable computing devices, including personal digital assistants (PDAs), media players (both audio and video), global positioning devices, and multi-functional devices that have numerous such functions.

One or more embodiments provide that the user interaction is through a stylus 130 or other pointing device. The type of interactions include, for example, screen taps, double taps, tap and hold, drags, and glyph entry (e.g. for handwriting input). Light variations caused by the stylus 130 are recognized when the stylus is brought into contact with the display surface 122, or alternatively, into proximity with the display surface 122. In one embodiment, stylus 130 includes a tip portion 132 having a contact point 134, and human interaction with display interface 120 is initiated by the contact point 134 being brought into contact (or close proximity) to the display surface 122.

In an embodiment, processing resources 123 and/or other logic ("device logic") of the device 100 are configured to recognize the presence of the stylus 130 when it interacts with the display interface 120, based on light variations caused by the stylus. The stylus 130, in combination with the light sensors may be configured to enable the device logic to distinguish light variations caused by the stylus 130 from light variations that are incidental, or otherwise not caused by the stylus. In this way, the device 100 is configured to interpret the stylus 130 coming into contact with display surface 122 (or in proximity to it) as a valid user interaction, at least in certain cases.

In one embodiment, the light variation caused by stylus 130 being brought into contact with the display surface 112 is identifiable by the display logic of computing device 100. A specific characteristic of the light variation caused by the stylus 130 may be detected and used as a basis for interpreting the presence of the stylus 130 in interaction with the display surface 120. The identification may be made at a speed that enables tracking of the stylus 130 as the stylus performs various actions, such as screen taps and drags. In addition, the computing device 100 and stylus 130 may be mutually configured to enable light variations from the stylus to represent use of the stylus 130 in an operational range. The operational range for use of the stylus 130 is shown by lines E-E in FIG. 1. According to an embodiment, use of the stylus 130 outside of the operational range may be ignored to avoid parallax issues (described with an embodiment of FIG. 3F), or to avoid interpreting inadvertent stylus use (or objects similar to the stylus) as valid interaction.

One or more embodiments provide for structuring stylus 130 so that light variations caused by the stylus are identifiable over other variations that are incidental and the result of the mobile nature of the device 120. For example, the mobile nature of the device 100 may cause the creation of shadows that would otherwise be detectable by the sensors of the display interface 120. According to embodiments, the stylus 130 has a physical characteristic that corresponds to one or more of a particular size, shape, tip surface feature, contour, aperture, or light reflective or absorptive properties. Other embodiments described herein use other features, such as color or light generated by the stylus 130. These features, when provided individually, or in combination with one or more other features, cause light variations that are identifiable and distinguishable from incidental light variations.

As described with one or more embodiments, computing device 100 is aware of ambient lighting conditions when detecting lighting variations. For example, reflective ambient lighting conditions may cast shadows, including shadows from the length of the stylus 130. Thus, the overall lighting variation caused by the stylus 130 may vary in reflective ambient lighting conditions, as opposed to non-reflective conditions where no shadows are expected to be cast. In this way, the device 100 is able to account for lighting conditions when interpreting whether a particular light variation is the result of the object 130 being positioned to indicate a valid user-interaction with the display interface 120.

In addition, as described with one or more additional or alternative embodiments, other variations may be made to the display interface 120 and/or device operations to enable light variations from stylus 130 to be detectable from incidental variations.

Figure 1B:
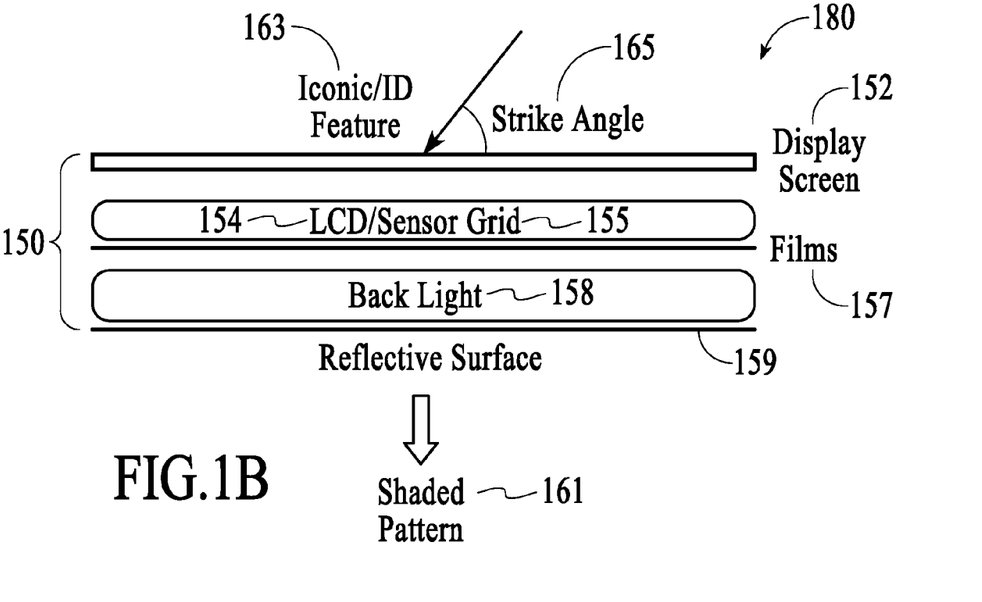
FIG. 1B is a simplified illustrative sectional view of a display interface system configured to detect light variations caused by a stylus or other object, under an embodiment of the invention.

FIG. 1B is a simplified illustrative sectional view of a display interface system configured to detect light variations caused by a stylus or other object, under an embodiment of the invention. In FIG. 1B, a display interface system 180 includes a display interface 150 and a processor 160 and/or other logic. The display interface 150 includes a display screen 152, a Liquid Crystal Display (LCD) 154, a light sensor grid 155, and a backlight 158. The LCD 154 and sensor grid 155 may be combined or integrated with one other.

In an implementation shown by FIG. 1B, the display interface 150 includes a reflective screen 159 in combination with the backlight 158. Under such a configuration, display interface 150 is transreflective, meaning the display interface 150 uses both front and back lighting to emit light from the display interface. Other implementations provide that the display interface 150 is reflective (in which case there would be no backlight 158) or transmissive (in which case there would be no reflective surface 159). Transreflective display interfaces provide benefits of good indoor and outdoor lighting, when ambient light can overpower an otherwise transmissive display interface.

According to an embodiment, display interface 150 is transreflective and is capable of setting reflective or transmissive light settings, either by user setting or by using sensors or other indicators to programmatically detect lighting conditions. In the presence of ambient conditions, display interface 150 is in reflective mode, and computing device 100 may be configured to account for the possibility of shadows result from ambient light on the stylus. In transmissive mode, computing device 100 may be configured to not account, or at least account less for the possibility of such shadows forming from the stylus 130. In the latter case, the assumption can be made that the device is being used in lighting conditions with negligible ambient light.

The display interface 150 may include various different configurations in which additional films and layers may be included. Depending on the implementation, polarization layers (not shown) may be provided between the LCD 154 and the display screen 152. Various films 157 and other layers may be provided elsewhere, such as between the LCD 154 and the backlight 158.

According to an embodiment, an output 161 of the display interface 150 corresponds to a lighting pattern that is at least the partial result of an iconic or otherwise identifiable tip feature 163 of the stylus 130 (FIG. 1A). The lighting pattern may include shading, reflection, hot and cold spots, and/or in the case of embodiments such as described with FIG. 12, additional lighting generated from the stylus 130. As described with other embodiments, the shading pattern may carry the iconic feature of the tip of the stylus 130 (FIG. 1A). Reflective or light absorption on the stylus tip may be used to create hot and cold spots, as described with embodiments of FIG. 9A, 9B, 10A, and 10B. FIG. According to another embodiment, the potential for any discrepancy from parallax may also be handled by configuring the computing device 100 (FIG. 1A) to ignore light variations resulting from use of stylus when it is at too acute of an angle (with respect to display surface 122). Such an embodiment is illustrated with FIG. 3F.

As illustrated by, for example, an embodiment of FIG. 1B illustrates the potential for a parallax issue that can result from the stylus 130 contacting the display screen 152, rather than the sensor grid 155. Under current technology, for example, there is a 0.2 mm gap between the position of the sensor grid (FIG. 1B) and the display screen 152 where the stylus actually makes contact. Because of this gap, the sensor grid 155 may detect the stylus hitting a slightly different position of the display screen 152, particularly when the stylus strike angle 165 (FIG. 1B) is acute. Alternatively, it is possible for the sensor grid 155 to not detect the stylus at all if the strike angle 165 is acute. The parallax issue presented may be addressed in several ways for various embodiments described herein. For embodiments such as described below with FIG. 4-8, where dimension, shape and/or surface features of the stylus tip portion or its contact surface are used to detect the stylus interaction, one or more embodiments provide for sizing the contact surface or feature being used to make the stylus identifiable so that the gap separation between the sensor grid 155 and the display screen 152 is insignificant. In other embodiments (such as described with FIG. 9A, 10A and 12) where reflection or light generation from the stylus tip portion are utilized, the short path of the light from the stylus tip to the display screen 152 and sensor grid 155 may mitigate any parallax issue that would otherwise result.

Figure 2:
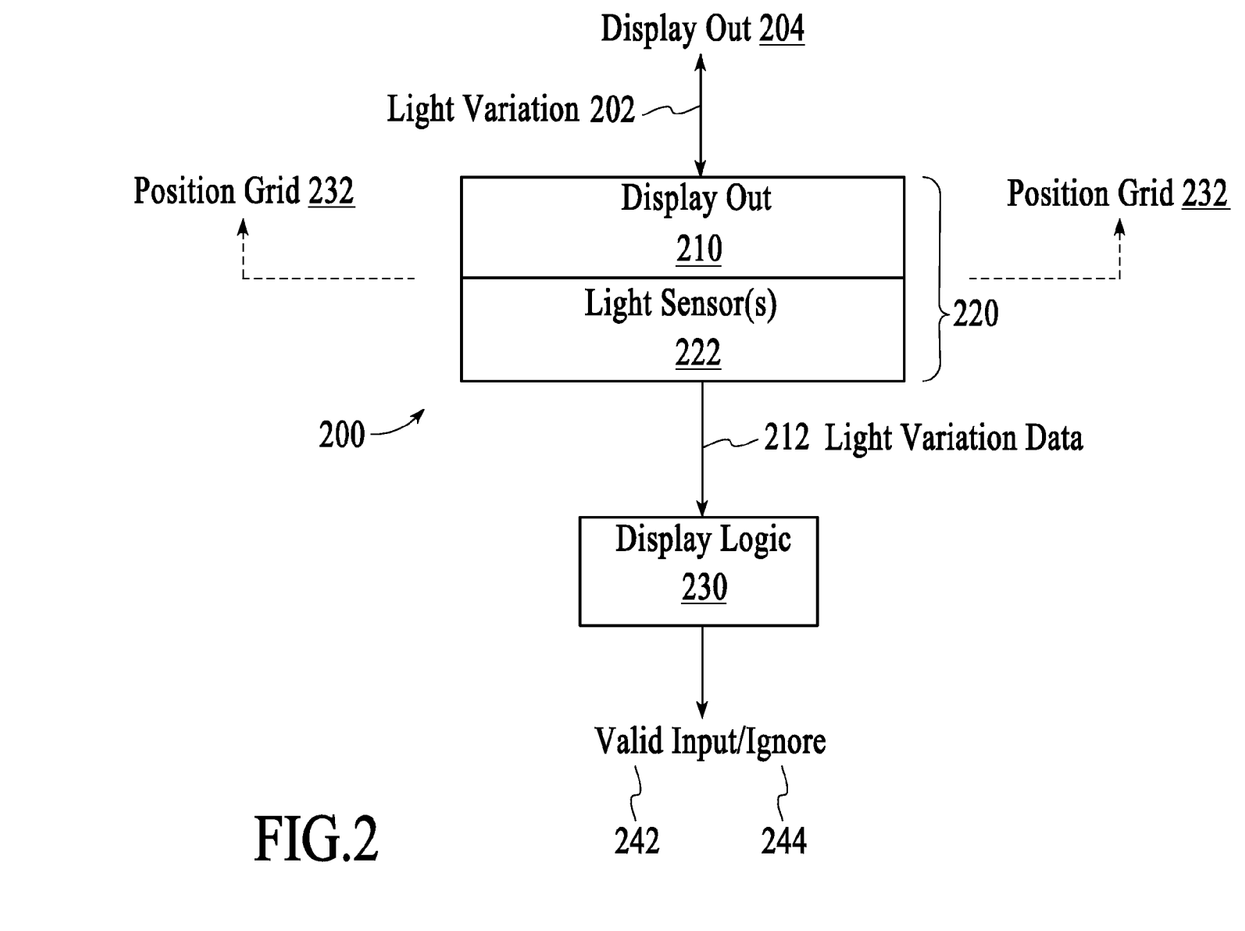
FIG. 2 is a block diagram of a light sensitive display interface, according to an embodiment of the invention.

FIG. 2 is a block diagram of a light sensitive display interface, according to an embodiment of the invention. A light sensitive interface system 200 such as shown by FIG. 2 may be implemented on a computing device such as shown by FIG. 1A, using the display interface 120 and processing resources and/or logic of the device. In an embodiment, a display interface 220 includes a display output component 210 and a light sensory grid 222. The display interface 220 may also include display logic 230. As further described with an implementation of FIG. 1A, the display output component 210 (alternatively referred to as the display screen) and the light sensor grid 222 may be combined into one module or device that is provided on the facade of the housing for the computing device. The display logic 230 may be in the form of software and programming executed by processing resources 130 (FIG. 1A) of the computing device 100 (FIG. 1A). However, in an embodiment, at least some of the logic described with FIG. 2 is performed by circuitry or firmware elements incorporated into the display interface 220. For example, display interface 220 may include circuitry or logic elements embedded to surround individual pixels provided with the display surface 122.

In an embodiment of FIG. 2, display interface system 200 detects light variations 202 from light cast onto a surface of the interface. At the same time, the display output component 210 may emit or reflect display light 204 for generating text, images and other content. Light variations 202 are detected by the light sensor grid 222 and converted into electrical signals corresponding to light variation data 212. The light variation data 212 is handled by the display logic 230.

A position grid 232 may be associated with the display interface, to provide coordinates or otherwise identify various positions that an object for user interaction with the display interface 220 may occupy. The light variation data 212 may be associated with various positions on the position grid 232, so as to define positions on which dark regions may be created by a stylus tip, or by shadow cast by the stylus' length, or by other objects or conditions that may direct a shadow or other light variation onto the display interface 220. From the light variation data 212, the display logic 230 determines whether light variation cast over a particular region of the display interface 220 correspond to a valid user-interaction with the display interface.

If the light variation data 212 is interpreted as valid input 242, the display logic 230 may capture the position of the input on the position grid 232 associated with the display interface system 200. One or more embodiments also provide that other characteristics of the interaction are captured, such as the length of time the object causing the light variation is present at a position, and whether the object is in movement. Otherwise, if the light variation data 212 is interpreted as not being a valid user input, the light variations data 212 results in an ignore output 244, at least for the particular position on the grid.

Light Variations From Size and Dimensions of Stylus Tip

One or more embodiments use the size and dimension of a stylus tip to distinguish and recognize light variations caused by the stylus from other objects or incidental light variations. According to embodiments described herein, a stylus tip is structured to cause an identifiable variation in light that is cast over the display interface. In an embodiment, the stylus tip has a shape and/or dimension that causes an identifiable variation in the light cast over the display interface 220 (FIG. 2). When light variations that are identifiable to the stylus tip are detected, display logic 230 (FIG. 2) may make a determination that the stylus tip was brought into contact or close proximity to the display surface 122 (FIG. 1A) of the display interface 120 (FIG. 1A), as part of a valid human interaction with the display interface.

Figures 3A, 3B:
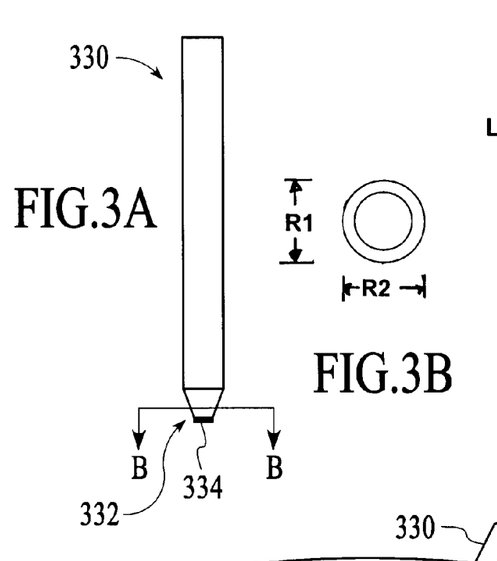
FIG. 3A-3E illustrate how a shape of a stylus tip can cause identifiable light variations, under one or more embodiments of the invention.

FIG. 3A-3E illustrate how a shape of a stylus tip can cause identifiable light variations, under one or more embodiments of the invention. In FIG. 3A, a stylus 330 is provided having a tip portion 332. The tip portion 332 forms a contact point 334, and may have a different overall shape or profile than a remainder of the stylus. The tip portion 332 may have a cross-sectional or end view that forms a basis for a characteristic light variation.

FIG. 3B is a bottom view of the tip portion of the stylus 330 illustrated in FIG. 3A, according to an embodiment of the invention. As shown by FIG. 3A and FIG. 3B, the tip portion 332 may be in the form of an ellipsoid or circle, having an elliptical or circular cross-section. Certain characteristics, such as aspect ratio (R1/R2) may be identifiers for the stylus tip portion 332. The shape of the tip portion 332 may be captured in the light variations that result from the tip portion being brought into contact with the display surface.

Figures 3C, 3D:
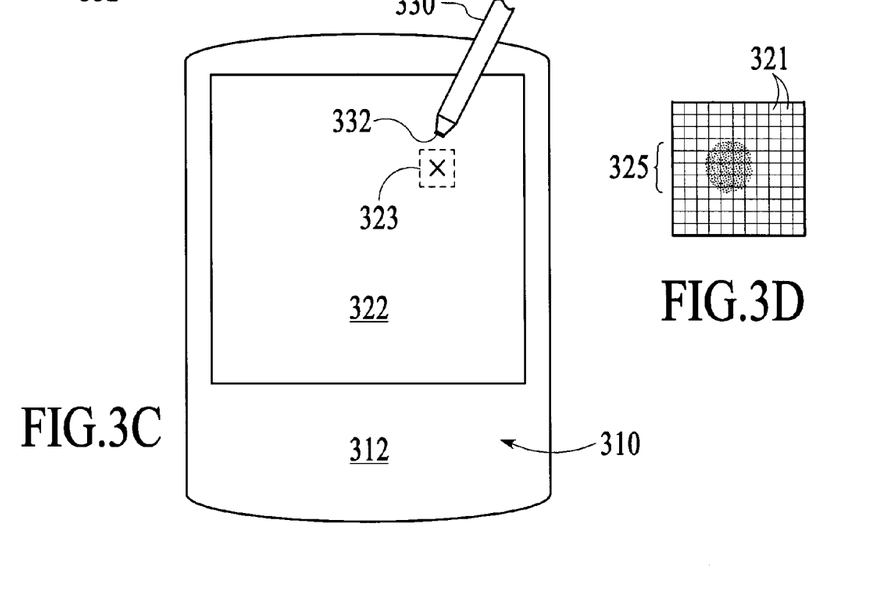

FIG. 3C illustrates stylus 330 being utilized for a screen tap on a display surface 322 of a small-form factor computing device 300. The display surface 322 may be part of an overall light sensitive display interface, such as described with one or more other embodiments described herein. As such, display surface 322 may be provided on a front facade 312 of a device housing 310. The screen tap may occur at a particular position 323 on the display surface 322.

FIG. 3D is a close-up (not to scale) of the region designated by the lines C-C, where the screen-tap occurred. In FIG. 3D, display surface 322 is shown to comprise a plurality of pixels 321. In one implementation, each of the pixels 321 includes one or more light sensor elements (not shown), such as a photodiode, that records a shaded pattern 325 caused by the stylus 330 and its tip portion 332 being brought into contact with the display surface 322 at the particular position 323 (FIG. 3C). In one embodiment, photodiodes are embedded with image elements (red, green and blue) that comprise each pixel 321. The relative dimension of each pixel 321 is small (e.g. 0.1 mm-0.15 mm), so the inclusion of a photodiode or other light sensor with the pixel 321 results in a grid of light sensors that can record shading to a fine degree of granulation.

The shaded pattern 325 is attributable to the stylus tip portion 332 (FIG. 3C). Display logic 220 (FIG. 2) of the computing device 200 (FIG. 2) may recognize characteristics that define the shaded pattern 325. Such characteristics of the shaded pattern 325 include overall shape and dimensional values, including longest dimension and aspect ratio between longest and shortest dimension.

Figure 3E:
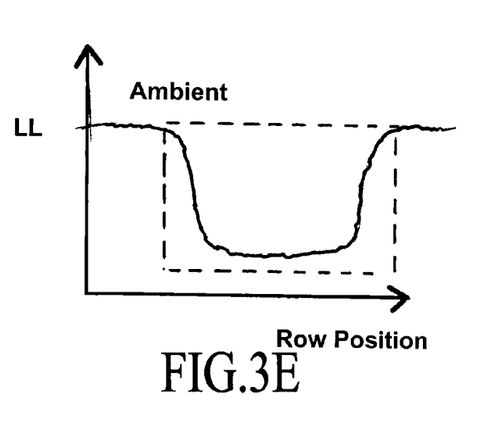

Prior to interaction with stylus 330, light sensors that are integrated with the display surface 322 (e.g. provided with individual pixels) record ambient light levels that have a general range of values. The presence of the stylus tip 332, as illustrated by the shaded pattern 325, cause a deviation from the ambient light levels. FIG. 3E shows variations in the value of the light level (LL) along a given row of pixels that comprise the display surface 322 (FIG. 3C) and which intersect the position 323 (FIG. 3C) where the stylus strikes. The variation in the value of the light levels has a particular geometric characteristic 335 that identifies with the shaded pattern 325 is described with FIG. 3D. The geometric characteristic 335 may include overall shape, dimension, curvature or other aspect reflected in a graph of FIG. 3E.

While embodiments of FIG. 3A-3E describe elliptical or rounded stylus tip portions, other shapes may be used. Examples of alternative shapes for the stylus tip portion 332 include rectangular or asymmetrical polygonal shapes.

Figure 3F:
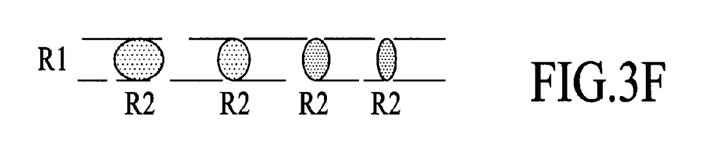
FIG. 3F illustrates use of shaded patterns resulting from interaction of a stylus with a display interface, under an embodiment of the invention.

One or more embodiments recognize that the strike angle of the stylus 330 may affect the overall shape and dimension of the shaded pattern 325. In one embodiment, the tip portion 332 is shaped so that the strike angle varies the minimum dimension of the geometric shape of the shaded pattern, but not the maximum dimension or the overall shape of the shaded pattern 325. FIG. 3F shows how the shaded pattern 325 caused by the stylus 330 may vary in dimension and shape depending on the strike angle (see strike angle 165 of FIG. 1B) of the stylus. In the case where the shaded pattern 325 is elliptical, for example, the aspect ratio (Radius1/Radius2) of the shaded pattern 325 increases the more the strike angle of the stylus 330 approaches a perpendicular orientation with respect to the display surface 322. Similarly, the aspect ratio of the shaded pattern 325 becomes smaller as the strike angle becomes more acute. However, in each case, the maximum dimension of the shaded pattern 325 stay about the same, regardless of the strike angle of the stylus 330. Furthermore, the general shape of the shaded pattern (e.g. ellipse) remains.

In an embodiment, the aspect ratio of the shaded pattern 325 is determined in order to detect when the strike angle 165 (FIG. 1B) of the stylus is overly acute. A set threshold may be determined for the aspect ratio, and if the detected aspect ratio is exceeded, the computing device may disregard the shading pattern. The particular value for the strike angle 165 (or the aspect ratio that represents a range of angle values) that is deemed excessive may depend on design implementation and factors. Among other considerations, a particular value 165 for strike angle may be deemed accidental, or may be deemed to have potential for parallax imprecision, as described above.

Figure 4:
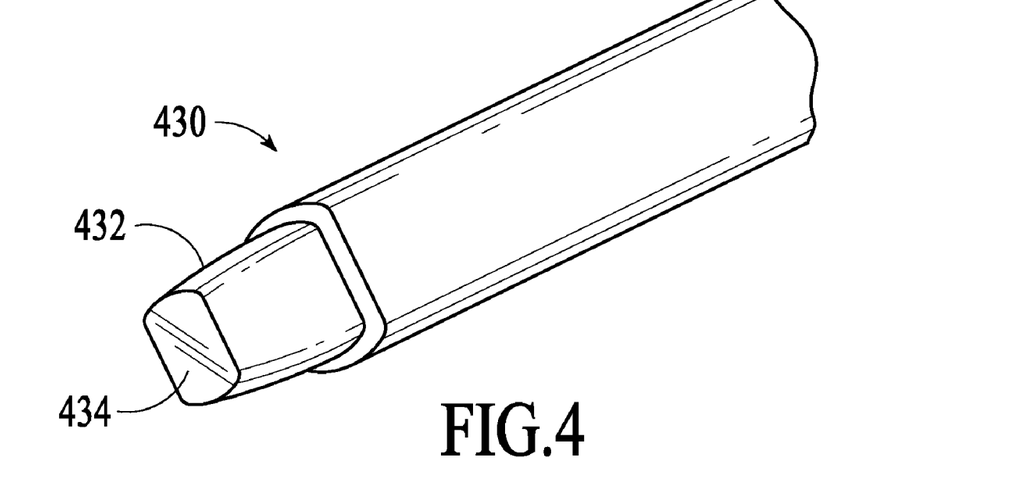
FIG. 4 illustrates another stylus having an iconic or identifiable tip portion, under an embodiment of the invention.

FIG. 4 illustrate another stylus having an iconic or identifiable tip portion, under an embodiment of the invention. In FIG. 4, a stylus 430 includes a tip portion 432 having a flat contact point 434. The contact point 434 has a polygonal (e.g. rectangular), two-dimensional geometric shape. As described with, for example, FIG. 3A-3E, the shape of the contact point 434 may create shaded light patterns on the display interface that have a particular shape and/or dimension that are identifiable to the stylus 430. In this way, the stylus 430 can be structured through its tip portion to enable shadow patterns created by the stylus being brought into contact with the display interface to be programmatically detected and attributed to the stylus 430.

Light Variations From Contours and Tip Features of Stylus

According to embodiments described herein, various different stylus features may implemented to create distinctive light variations when the stylus tip portion makes contact with the display interface. Surface features may create variations in how much ambient light is included in the shade cast by the tip portion of the stylus tip portion. Furthermore, the display interface emits light, and surface features of the stylus tip portion may create distinctive light variations by leveraging light reflected off of the stylus tip portion.

Figure 5:
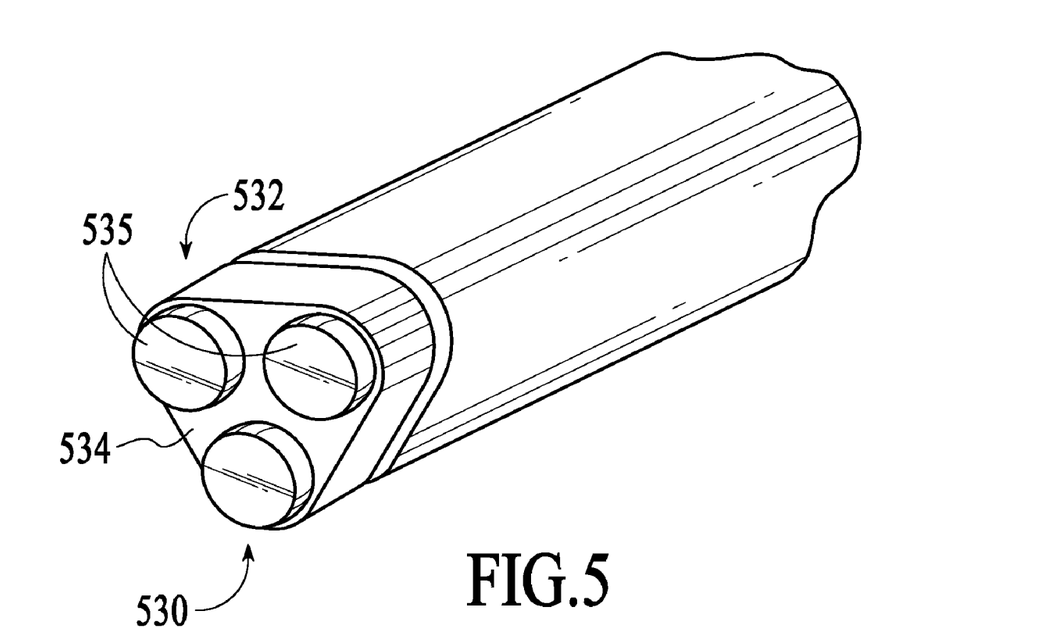
FIG. 5 illustrates a stylus tip portion that includes surface variations, under an embodiment of the invention.

FIG. 5 illustrates a stylus 530 with a tip portion 532 that includes surface variations provided on a contact point 534 for creating an identifiable shaded pattern, under an embodiment of the invention. In an embodiment of FIG. 5, surface variations are provided in the way of protrusions 535. The protrusions 535 create a more distinctive shaded pattern than, for example, a stylus tip portion such as shown with an embodiment of FIG. 4. The protrusions 535 may vary the shaded portion by creating variation in any light reflected or directed off the tip portion 532. While an embodiment of FIG. 5 illustrates use of protrusions 535, various other surface features or contouring features may be utilized. Examples include dimples, divots, swirls, or other contours that alter the contact point 534, or otherwise cause a distinctive variation in light reflected from the display interface.

Figure 6A:
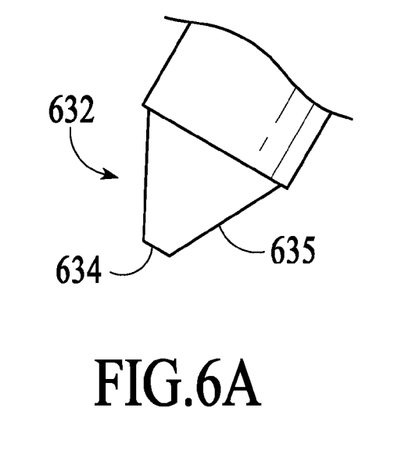
FIG. 6A illustrates a stylus tip portion with a conical length, under an embodiment of the invention.

FIG. 6A illustrates a stylus tip portion 632 with a conical length 635 that extends to a contact point 634. The contact point 634 creates a dark spot in the shaded region, with gradual lightening from light reflected off of the conical length 635. The gradual lightening may be created in part by a combination of reflected or ambient light.

Figure 6B:
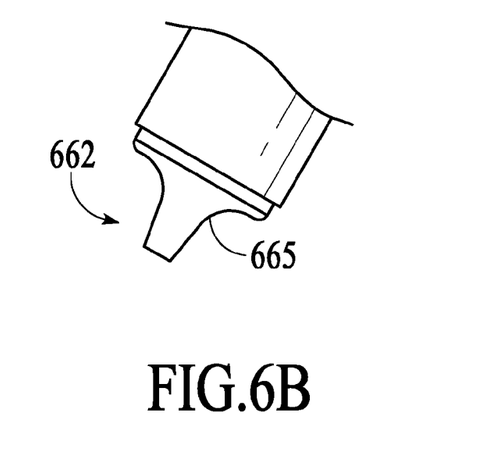
FIG. 6B illustrates a variation to a stylus tip portion of FIG. 6A, under another embodiment of the invention.

FIG. 6B provides a variation to a stylus tip as shown in FIG. 6A. In an embodiment of FIG. 6B, the stylus tip portion 662 includes the conical length 665 with curvature.

Figure 7:
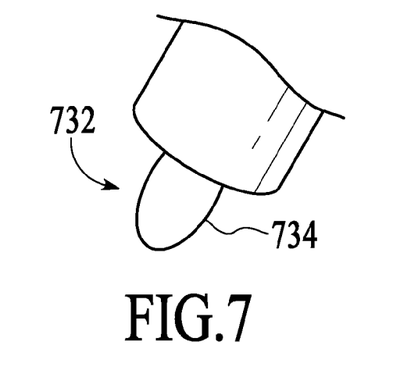
FIG. 7 illustrates a stylus tip portion with a bulbous tip portion, under an embodiment of the invention.

FIG. 7 illustrates a stylus tip portion 732 with a bulbous tip 734. As described with, for example, an embodiment of FIG. 3A-3E, the bulbous tip 734 may form a shaded pattern that includes a shape and/or dimension that is characteristic of the bulbous tip. At the same time, the contouring the bulbous tip 734, in connection with reflected light, may create peripheral lightening that provides further recognizeable characteristics for the shaded pattern.

Figure 8A:
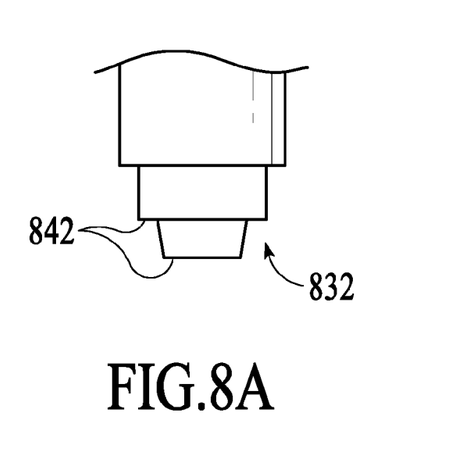
FIG. 8A and FIG. 8B illustrate a stylus tip portion having concentric and receding structures that are stepped from one another, under an embodiment of the invention.
Figure 8B:
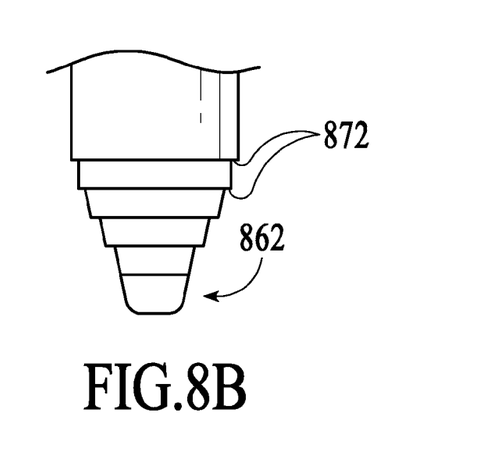

In embodiments of FIG. 8A and FIG. 8B, a stylus tip portion 832, 862 includes concentric and receding structures 842, 872 that are stepped from one another. Such a tip portion construction may create a shaded pattern that, for example, darkens towards the center, with light ring formations towards the edge of the shaded pattern.

Stylus Tip Structures That Maximize Reflection

One or more embodiments provide for use of a stylus that include structures for actively reflecting or absorbing light from the display interface. Such structures result in the creation of hot or cold spots on the shaded pattern created by use of the stylus on the display interface. Hot and cold spots refer to regions of a shaded pattern that are sharply brighter or darker than the remainder of the region.

Figure 9A:
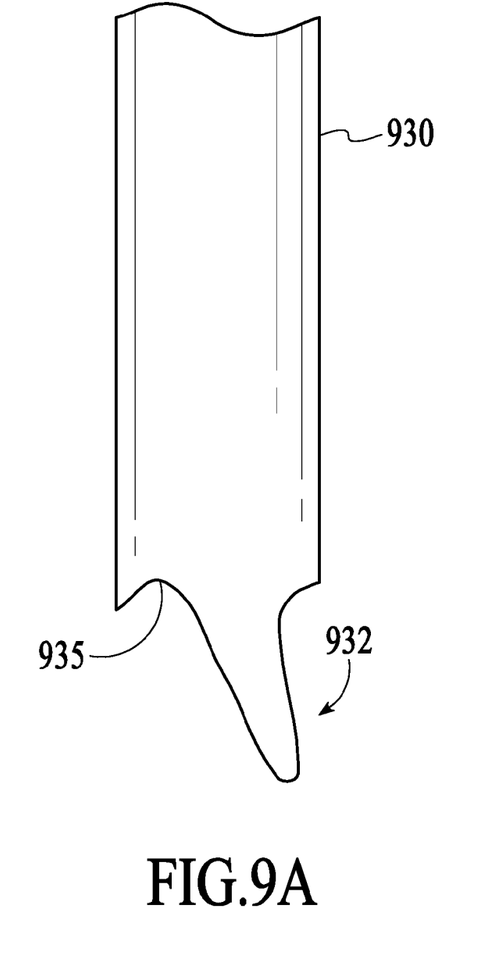
FIG. 9A illustrates a stylus having a tip portion that includes a contoured depth variation along a surface that overlays the display surface when the stylus is used, under an embodiment of the invention.

FIG. 9A illustrates a stylus 930 having a tip portion 932 that includes a contoured depth variation along a surface that overlays the display surface when the stylus is used. In an embodiment of FIG. 9A, the tip portion 932 is shaped into a focusing feature 935 or lens that focuses some reflected light from the display interface. The result of the focusing is that the lens 935 creates a hot spot in the shaded pattern that the stylus would otherwise create. The hot spot, either by itself or with other characteristics (e.g. overall shade of the light pattern), may form the identifiable characteristic of the light variation caused by the stylus 930.

Figure 9B:
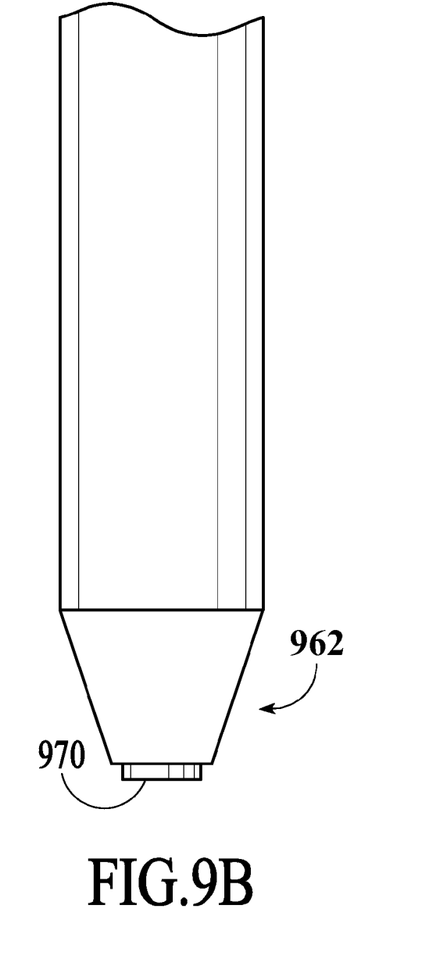
FIG. 9B illustrates use of a reflector on a surfaces of a stylus tip portion, under an embodiment of the invention.

As an alternative or addition to the focusing feature 935, an embodiment of FIG. 9B illustrates use of a reflector 970, such as a mirror, on one or more surfaces of a stylus tip portion. Reflectors 970 may be provided on any surface of a stylus tip portion 962, including on any stylus tip portion described above.

Figure 9C:
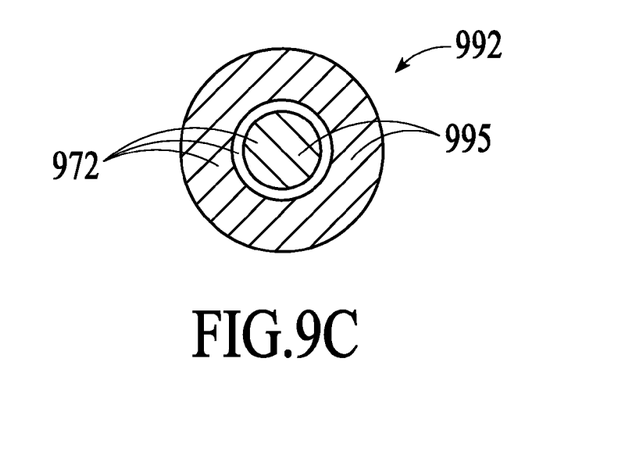
FIG. 9C illustrates an end view of a stylus tip portion having a reflector, under an embodiment of the invention.

As another implementation, FIG. 9C illustrates an end view of a stylus tip portion 992 similar to an embodiment of FIG. 8A, in which receding, concentric structures 972 are used to form the tip portion 992 of the stylus. A configuration such as shown in FIG. 9C provides for use of reflectors 995 on alternating surfaces of the concentric structures. Alternative configurations and placements of reflectors 995 are contemplated.

While an embodiment of FIG. 9A-9C illustrate specific implementations and positing of reflectors or lens structures, embodiments provide that a reflector can positioned on any tip portion or contact point of a stylus. According to one or more embodiments, the presence of a reflector, or even a lens or focusing feature, can increase the light level of a portion of the shaded pattern caused by the stylus tip portion past the ambient level. The resulting hot spot created by any reflector or lens feature can provide a marker for the corresponding stylus.

Figure 10A:
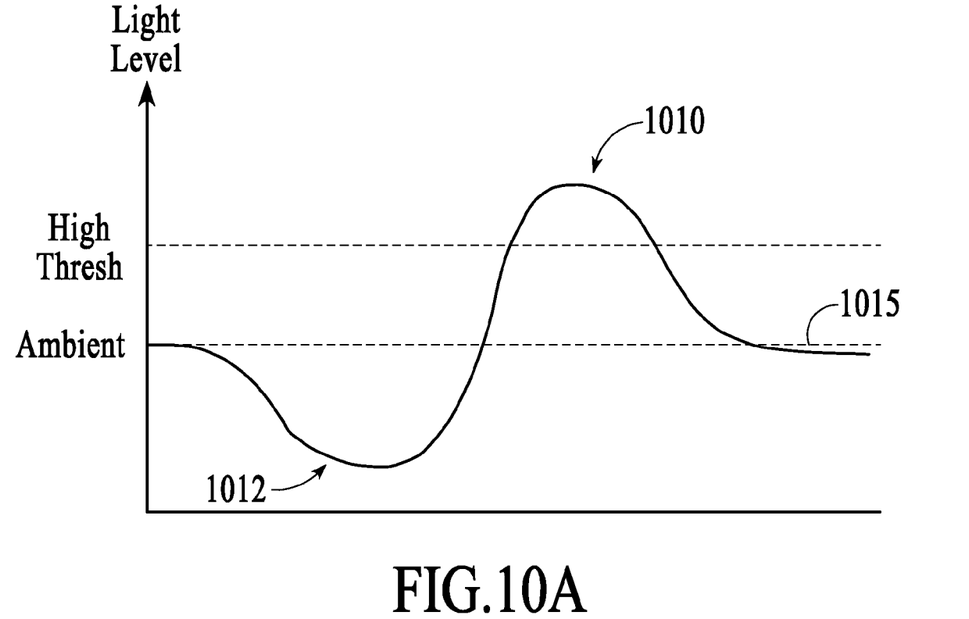
FIG. 10A illustrates an illumination level on a section of a shaded pattern resulting from use of a stylus such as shown with an embodiment of FIG. 9A.

FIG. 10A illustrates an illumination level on a section of a shaded pattern resulting from use of a stylus such as shown with an embodiment of FIG. 9A. As described with FIG. 3E, for example, the illumination level may correspond to the amount of light detected by individual light sensors incorporated in a row or section of pixels that extend across the shaded pattern caused by the stylus tip portion. The illumination level across the shaded region may be characterized by a respective hot and cold region 1010, 1012. The hot region 1010, may under one implementation, be brighter than the ambient light level 1015. The cold region 1012 may correspond to darkness resulting from the contact surface of the stylus tip forming the shadow over the display interface.

Figure 10B:
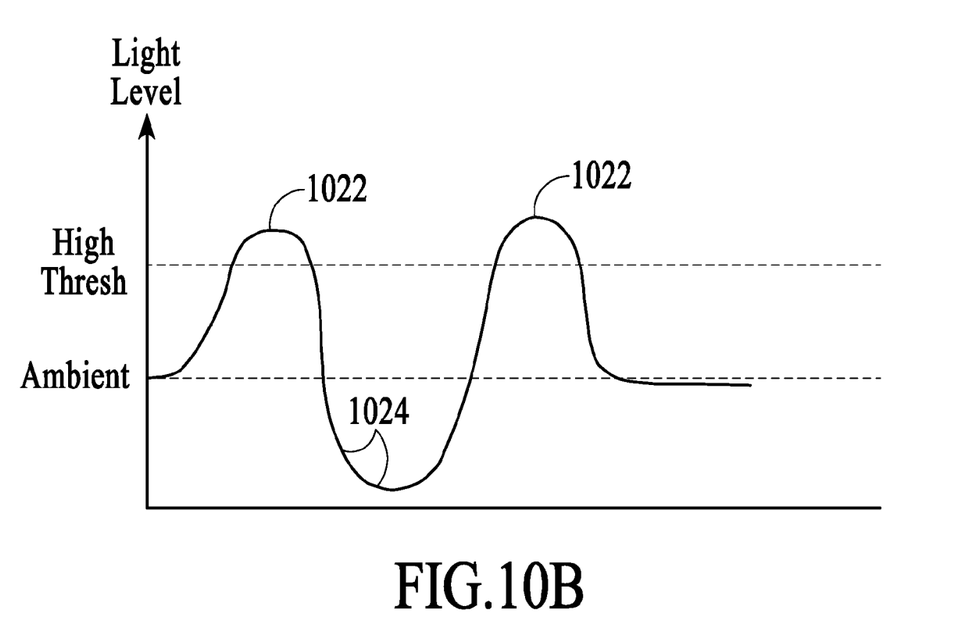
FIG. 10B illustrates an illumination level on a section of a shaded region caused by a stylus such as shown by an embodiment of FIG. 9C.

FIG. 10B illustrates an illumination level on a section of a shaded region caused by a stylus such as shown by an embodiment of FIG. 9C. As a tip portion of FIG. 9C includes multiple spaced apart reflectors, the illumination level on the section of the shaded region may be characterized by multiple hot spots 1022 and one or more cold spots 1024. The presence of these characteristics on a shaded pattern of the display interface may be characteristic of use of the particular stylus.

As shown by embodiments described above, the use of reflectors and/or focusing elements can create distinctive hot spots for any structure or surface comprising the tip portion of a stylus. For example, even with a simplified stylus construction such as shown with an embodiment of FIG. 4, the contact surface 434 (FIG. 4) of a tip portion 432 (FIG. 4) may be equipped with a reflector (not shown) to create a hot spot of a particular shape and/or dimension. The brightness occupying some or all of the otherwise shaded pattern formed the tip portion may comprise the identifiable characteristic of the light variation caused by the particular stylus.

Figure 11A:
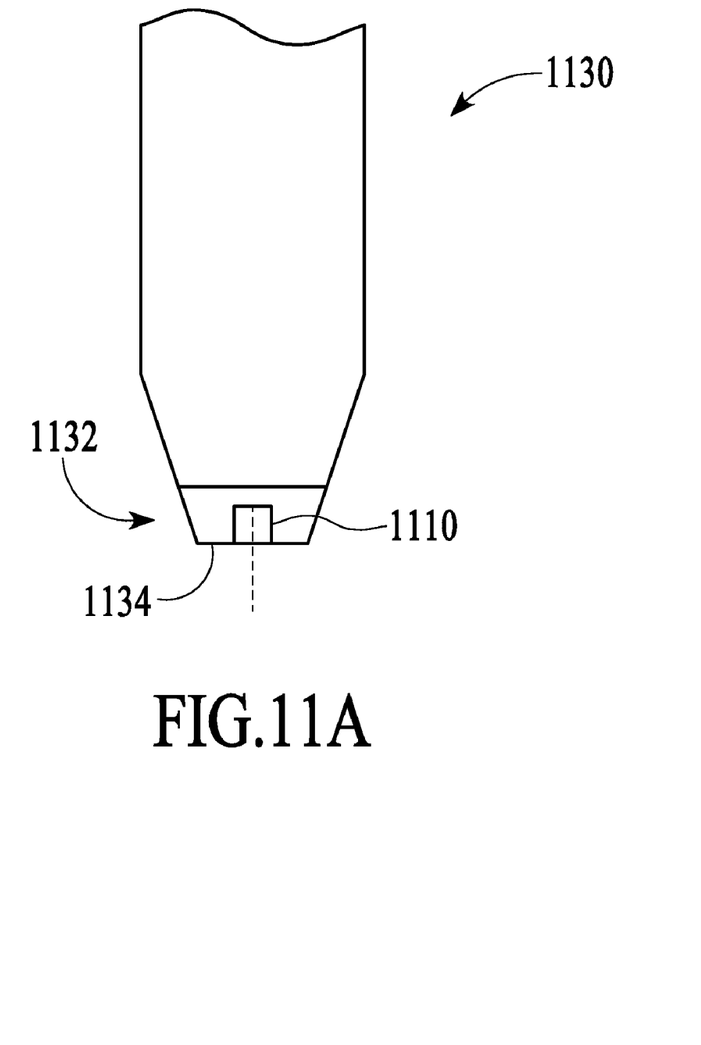
FIG. 11A and FIG. 11B illustrate a tip construction for a stylus in which apertures or other features are provided, under an embodiment of the invention.
Figure 11B:
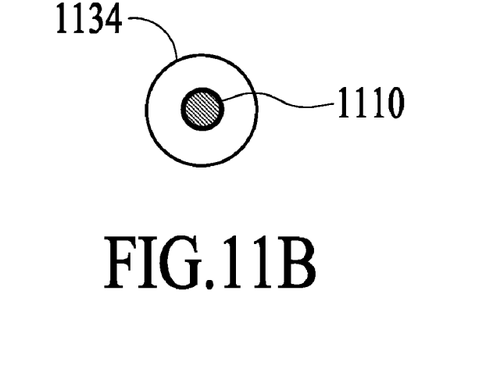

FIG. 11A and FIG. 11B illustrate a tip construction for a stylus in which apertures or other features are provided, under an embodiment of the invention. In one embodiment, an aperture 1110 is formed into a contact point 1134 of a tip portion 1132 on stylus 1130. In one implementation, aperture 1110 provides a region on the tip portion 1132 that does not reflect as much light as surrounding surfaces of the tip portion, as light passing into the aperture is less likely to reflect back. The result is the creation of a dark or colder spot in the region of the shaded pattern caused by the aperture 1110.

An alternative to an aperture, light absorbent material may be used and incorporated into the stylus tip portion. The light absorbent material may absorb, rather than reflect, light emitted from the display interface. Similar to use of an aperture 1110 (FIG. 11), the use of light absorbent material may make a shaded pattern created by use of the stylus tip portion more identifiable, as the resulting cold spot may be darker or more geometrically distinct than incidental shading or light variations.

Light Emitting Stylus

Figure 12:
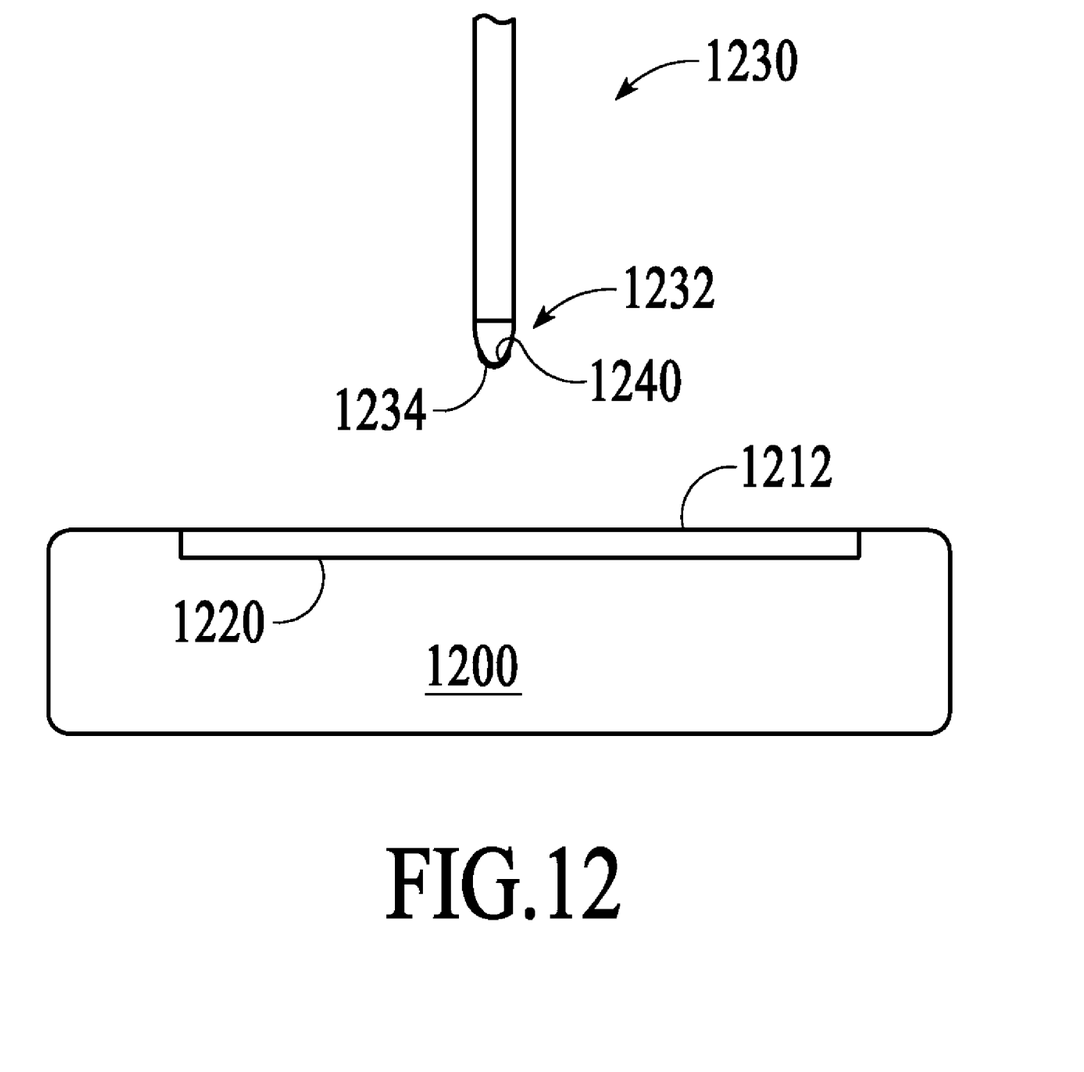
FIG. 12 illustrates such a light emitting stylus, under an embodiment of the invention.

Rather than use reflection, one or more embodiments provide that the stylus itself is capable of light generation to enable the computing device to identify lighting variations that are the result of a stylus for human interaction. FIG. 12 illustrates such a light emitting stylus 1230 for use with a light sensitive display interface 1220, according to one or more embodiments of the invention. A lighting source 1240 may be positioned with or as the contact point 1234, or elsewhere in the tip portion 1232, to create a light variation on the display surface 1212 of the computing device when the computing device is brought into contact or close proximity to the display interface 1220.

In one implementation, the light source 1240 is a Light Emitting Diode (LED), although numerous other light sources may be used, such as incandescent or even infrared light sources. The light emission from stylus 1230 may be constant, modulated and/or intermittent. In each case, computing device 1200 is configured to detect and interpret light variations from the stylus. In one implementation, the stylus 1230 may emit light (constant or modulated) constantly over a duration of time that includes the user's interaction with the display interface 1220. For example, the user may manually operate a switch on the stylus 1230 to trigger the light source 1240. Still further, the stylus 1230 may be configured to trigger the light source only when it is brought into proximity or contact with the display screen 1212 of the computing device 1200. For example, the light source 1240 may be touch-sensitive or responsive to a user's grip, in which case it triggers on and sends a light flash. When brought into contact with the display interface, light source 1240 may flash. Light sensors of the display interface 1220 may then capture the light flash and be ready to interpret other light variations that are attributable to the stylus 1230. Subsequent light variations that are identifiable to the light source 1240 may be interpreted by the processor and/or display logic as a valid user-interaction.

Color Sensitive Light Sensitivity

Figure 13:
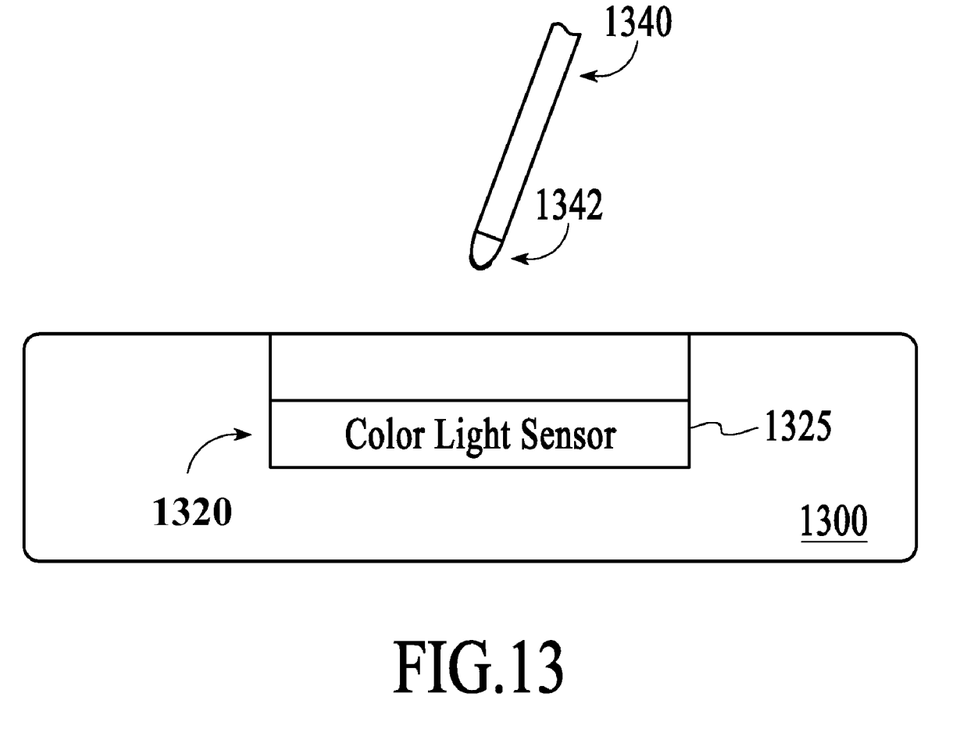
FIG. 13 illustrates a stylus with a colored tip region, under an embodiment of the invention.

As an addition or alternative embodiment, one or more embodiments that the computing device 1300 includes capabilities to detect color. According to an embodiment such as shown by FIG. 13, the stylus 1340 includes a tip region 1342 that is colored. The computing device 1300 includes color sensitive light detection sensors 1325 as part of a display interface 1320 or other feature. Ambient light and/or reflected light from a display screen 1312 of computing device 1300 may result in light variations that are detectable and identifiable from the stylus tip 1342.

As an alternative, tip region 1342 may be distinctively shaded, and the sensor of the computing device 1300 may detect shading. For example, the tip region 1342 may be black, or light grey, and result in distinctive light variations.

Flickering

Figure 14:
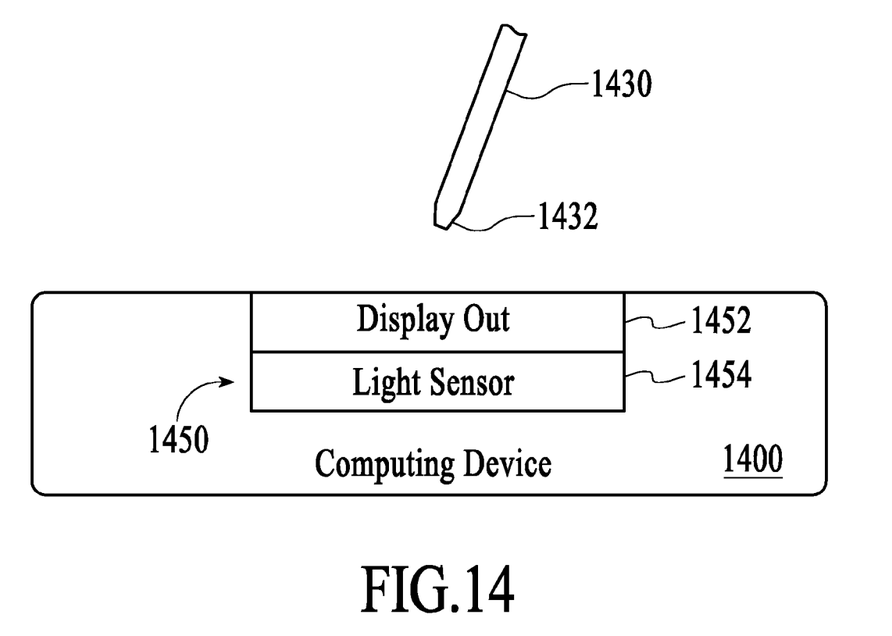
FIG. 14 illustrates a display interface provided with a computing device, under another embodiment of the invention.

Another mechanism for use in detecting a stylus tip is to configure or modify light outputted from the display interface, and use reflection from the stylus to enable the computing device to detect a lighting variation that originated from the display interface of the computing device. FIG. 14 illustrates a display interface 1450 provided with a computing device 1400, under an embodiment of the invention. In describing an embodiment of FIG. 14, reference is made to an embodiment of FIG. 1B for purpose of describing suitable sub-components and elements for implementing an embodiment such as described. Accordingly, the display interface 1450 includes a display output component 1452 (e.g. LCD 154 and backlight 158 of FIG. 1B) and light sensor component 1454 (e.g. sensor grid 155 of FIG. 1B). A stylus 1430 with a reflective tip portion 1432 is provided over the display interface 1450 to illustrate the device in use. Under one embodiment, the display output component 1452 modulates or flickers emitted light. In the case where the display interface 1450 is transmissive or has a transmissive mode of operation, flickering may be accomplished by modulating the backlight 158 (FIG. 1B) portion of the output component 1452. In a reflective scenario, the reflective surface 159 (FIG. 1B) may be vibrated or moved in some way to cause flickering.

Numerous other lighting variations that can be emitted from the display output component 1452 are contemplated, including those created by film or polarization. In each case, the light sensor component 1454 is configured to detect the variation, and display logic or processors can identify the variation and associate it with the presence of the stylus 1430.

Shading From Stylus Length

Figure 15A:
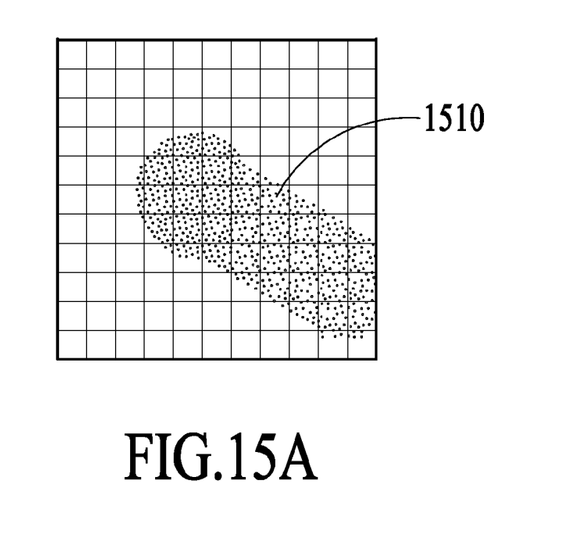
FIG. 15A and FIG. 15B illustrate an obfuscated shading pattern that can be handled with one or more embodiments of the invention.
Figure 15B:
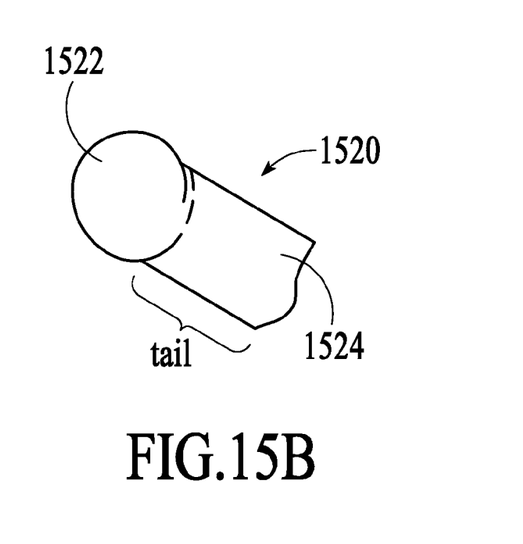

One or more embodiments contemplate that a length of a stylus may cast a shadow onto a display interface. Such a shading may merge into the shade or light variation from the stylus tip portion, and cause obfuscation with shading from the tip portion of the stylus. FIG. 15A illustrates an obfuscated shading pattern 1510 as it might appear on pixels or discrete areas of a light sensitive display interface. FIG. 15B illustrates an outline 1520 of the shading pattern 15 10. In an embodiment, display logic 230 (FIG. 2) can identify a head portion 1522 from a tail portion 1524 of a shading pattern 1510. Alternatively, display logic 230 may identify the head portion 1522 independent of the tail portion 1524. For example, the display logic 230 may be configured to recognize the iconic aspect of the head portion 1522, and permit obfuscation of the shading pattern 1510 as a whole from one side of the head portion 1522.

Furthermore, the display logic 230 may be configured to implement stylus identification in the presence of obfuscation with the stylus body when certain lighting conditions are present. For example, the display logic 230 may detect reflective ambient light settings, or identify when a transreflective display interface is in a reflective mode of operation. In such instances, the display logic 230 may be configured to account or accommodate obfuscated shadow patterns that include stylus body shading.

Additionally, some embodiments described herein are inherently more capable of reducing or overcoming shadow obfuscation. For example, use of reflectors or other features to create hot or cold sports in the light levels detected by the light sensors may create distinctive variations that can be used to identify the stylus tip even when obfuscation is present from the shading of the stylus body. Likewise, use of light generating stylus, or color sensors can achieve a similar result. Even shaping the stylus tip, or creating protrusions or other surface features (e.g. FIG. 5) to make the stylus tip shading more distinctive can mitigate or overcome obfuscation issues.

Timing or Mode Setting

One or more embodiments also provide for use of a programmatic timing or mode setting to detect a stylus tip. In one embodiment, the amount of time a light variation is static and darkened or otherwise noticeable present may be attributable to the stylus tip being pressed onto the display. A computing device such as described with other embodiments may factor whether the light variation is relatively static for a given duration that is characteristic of stylus interaction with the display interface. If the timing is characteristic, then the computing device may be more likely to interpret the stylus interaction as having occurred. Such a timing determination may be used in connection with any of the embodiments described above.

A mode setting may also be implemented that triggers the computing device to initiate interpretation of light variations on a light sensitive display interface. Such a mode setting may be used in connection with any of the embodiments described above. The mode setting enables the device to ignore shading patterns cast onto it so as to avoid inadvertent input. For example, a computing device may be operable in a non-stylus mode, and the user's accidental casting of shadows onto the display interface would not result in the device receiving input. But once the mode setting is triggered, the device interprets shading or other light variations that may be the result of the stylus. Thus, the display interface is selectively operated in light-sensitive mode, and this reduces the occurrence of inadvertent input.

According to an embodiment, mode setting may be accomplished through any kind of user-input (e.g. button press) or setting (e.g. for a set duration immediately after the device is turned on, until no activity occurs). In one embodiment, a mode setting to operate the device in light-sensitive mode may be triggered by the first stylus tap satisfying a timing criteria. For example, as described above, if the computing device detects the user providing a press and hold for a given duration, the device mode setting may be triggered into light detection mode.

CONCLUSION

It is contemplated for embodiments of the invention to extend to individual elements and concepts described herein, independently of other concepts, ideas or system, as well as for embodiments to include combinations of elements recited anywhere in this application. Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for operating a display interface of a computing device, the method comprising:
    detecting a variation in light that is directed onto and through a display screen of the display interface;
    identifying a characteristic of the light variation that is directed onto and through the display screen, wherein identifying the characteristic of the light variation includes detecting a dimension or shape of the light variation; and
    making a determination as to whether the variation in light is to be interpreted as an input or to be ignored based on the characteristic, wherein making the determination as to whether the variation in light is to be interpreted as an input or to be ignored based on the characteristic includes making the determination that the variation is an input based on the shape of the light variation correlating to a tip portion of an object;
    causing the display interface to emit light that has a particular characteristic, and
    wherein identifying a variation in light includes detecting the particular characteristic reflected back to the display interface from an object that is configured to reflect the particular characteristic back, and
    wherein making a determination as to whether the variation in light is to be interpreted as an input includes interpreting the variation in light as the input when the detected characteristic includes the particular characteristic reflected back.

2. The method of claim 1, further comprising identifying a duration of time that the light variation is present or relatively static, and wherein making a determination as to whether the variation in light is to be interpreted as an input or to be ignored based on the characteristic includes making the determination that the variation is input based in part on the duration of time.

3. The method of claim 1, further comprising identifying a mode setting of the computing device, and wherein making a determination as to whether the variation in light is to be interpreted as an input or to be ignored based on the characteristic includes making the determination that the variation is input based in part on the mode setting.

4. The method of claim 1, wherein the method is performed using a processor of the computing device.

5. The method of claim 1, wherein the method is performed using logic integrated into the display interface.

6. The method of claim 1, wherein causing the display interface to emit light that has a particular characteristic includes flickering the emitted light, and wherein detecting the particular characteristic includes detecting a flickering reflection from the tip portion of the object.

7. The method of claim 1, further comprising detecting a condition representing a lighting condition in which the display interface of the computing device is operated.

8. The method of claim 7, wherein detecting a condition representing a lighting condition includes detecting the condition corresponding to presence of ambient light, and wherein making a determination as to whether the variation in light is to be interpreted as an input includes accounting for the presence of a shadow created by the ambient light on a length of an object that is brought into contact or proximity with a surface of the display interface to provide the input.

* * * * *